(12) United States Patent
Williams

(10) Patent No.: US 11,746,831 B1
(45) Date of Patent: Sep. 5, 2023

(54) ATTACHMENT DEVICES FOR A TRACTOR PTO ATTACHMENT SITE AND METHODS OF USE

(71) Applicant: Cedric Williams, Cypress, TX (US)

(72) Inventor: Cedric Williams, Cypress, TX (US)

( * ) Notice: Subject to any disclaimer, the term of this patent is extended or adjusted under 35 U.S.C. 154(b) by 255 days.

(21) Appl. No.: 17/215,771

(22) Filed: Mar. 29, 2021

Related U.S. Application Data

(60) Provisional application No. 63/033,626, filed on Jun. 2, 2020.

(51) Int. Cl.
  *F16D 1/112* (2006.01)
  *F16D 1/116* (2006.01)
  *F16D 1/10* (2006.01)

(52) U.S. Cl.
  CPC .............. *F16D 1/112* (2013.01); *F16D 1/116* (2013.01); *F16D 2001/103* (2013.01)

(58) Field of Classification Search
  CPC ....... A01B 71/06; F16B 21/165; F16D 1/033; F16D 1/076; F16D 1/0847; F16D 1/112; F16D 1/116; F16D 2001/103; Y10T 403/7041; Y10T 403/7045
  USPC ................................................. 464/149, 182
  See application file for complete search history.

(56) References Cited

U.S. PATENT DOCUMENTS

| | | | | |
|---|---|---|---|---|
| 4,242,889 A * | 1/1981 | Muller | ................... | F16D 1/076 |
| | | | | 464/157 |
| 5,469,931 A * | 11/1995 | Kawata | ................... | F16D 1/076 |
| | | | | 464/182 |
| 10,247,245 B2 * | 4/2019 | Uhrick | ................... | F16D 1/076 |
| 10,253,821 B2 * | 4/2019 | Knuth | ................... | F16D 1/108 |
| 10,480,587 B2 * | 11/2019 | Knuth | ................... | F16D 1/108 |
| 10,513,148 B2 * | 12/2019 | Fuchs | ................... | F16D 1/076 |
| 11,313,417 B2 * | 4/2022 | Spector | ................... | F16D 1/112 |

FOREIGN PATENT DOCUMENTS

DE                  3408857 C1 *    7/1985  .............. F16D 1/116

\* cited by examiner

*Primary Examiner* — Josh Skroupa
(74) *Attorney, Agent, or Firm* — Quisenberry Law PLLC

(57) ABSTRACT

Devices for connecting a power take off shaft to a drive shaft of an implement. The devices may include a connection device body having a cylindrical housing including a plurality of connection teeth. The devices may include a second body having a cylindrical body member with an annular plate including a slot. The devices may include an annular adapter having a projection adapted for slidable engagement with the slot in the annular plate of the second body, and a plurality of adapter teeth adapted for releasable engagement with the connection teeth on the annular engagement member. The devices may include a cylindrical sleeve disposed around the cylindrical housing of the connection device body and moveable between an engaged position and a disengaged position. The devices may include a spring disposed around the cylindrical housing of the connection device body to urge the sleeve into its engaged position.

9 Claims, 4 Drawing Sheets

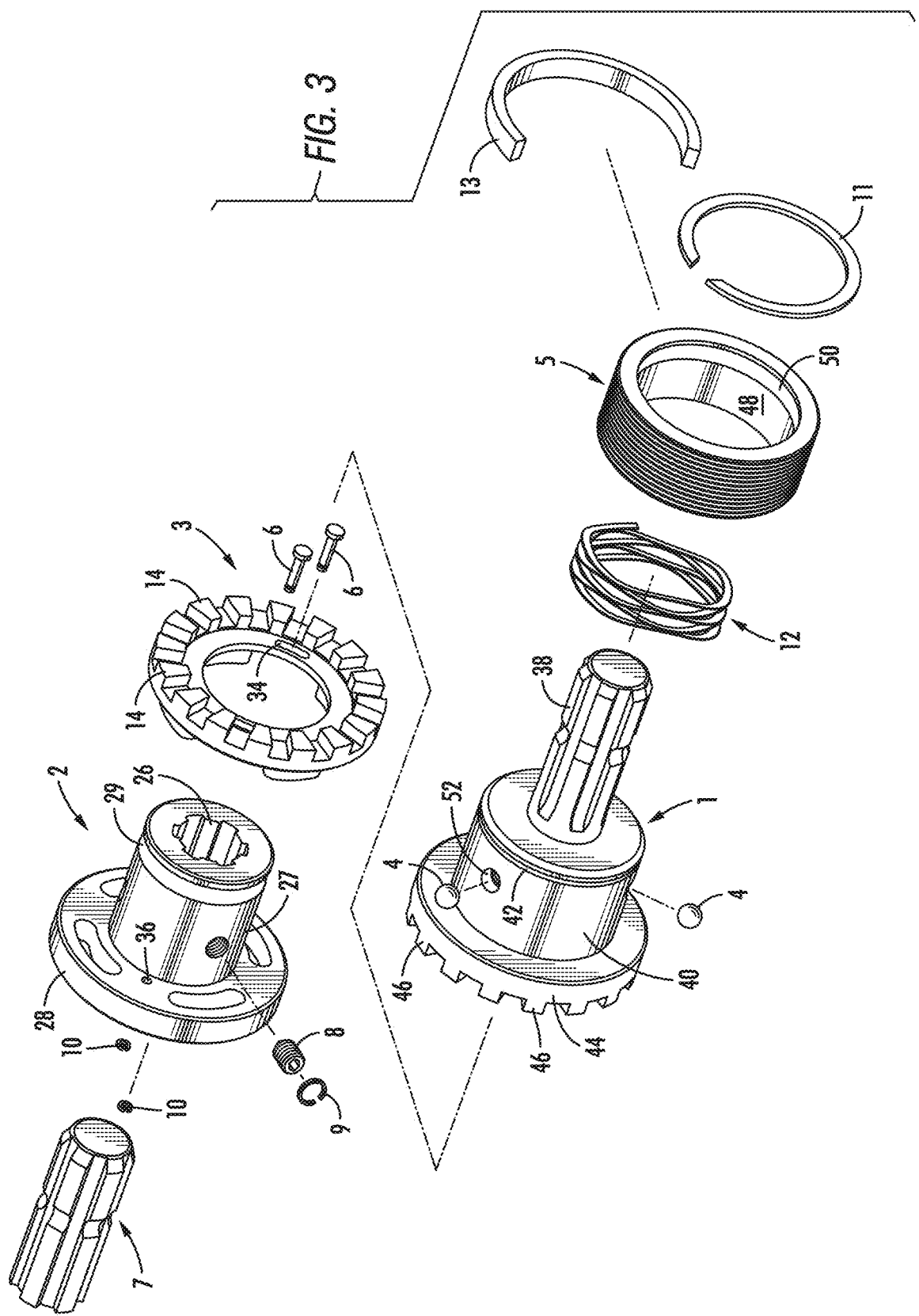

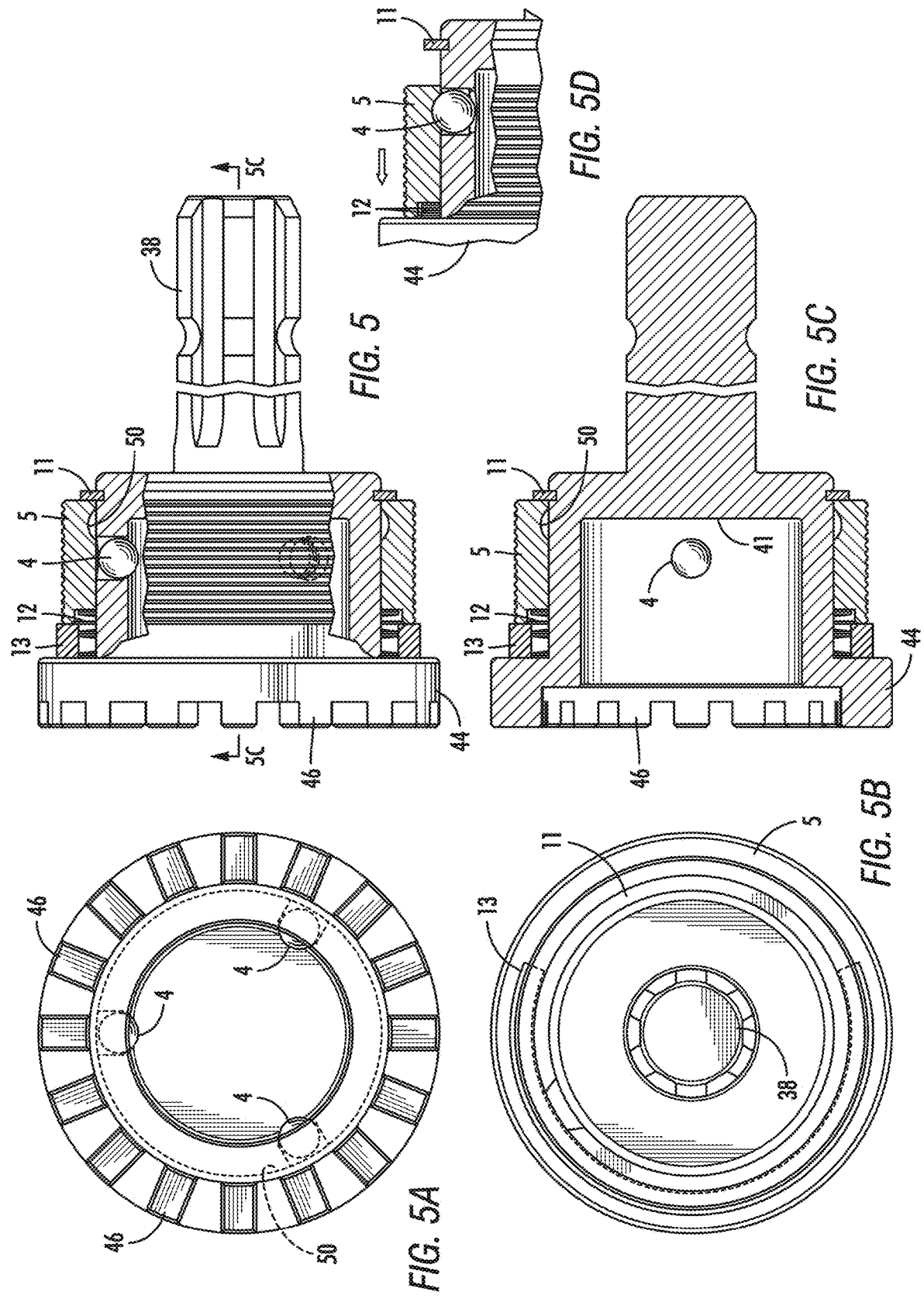

US 11,746,831 B1

ATTACHMENT DEVICES FOR A TRACTOR PTO ATTACHMENT SITE AND METHODS OF USE

RELATED APPLICATIONS

This application claims the benefit of U.S. Provisional Application No. 63/033,626, filed Jun. 2, 2020, the contents of which are fully incorporated herein by reference.

BACKGROUND OF THE INVENTIONS

1. Field of the Inventions

The present inventions relate generally to connection systems for securing tractor implements to a tractor, and more specifically, to attachment devices for aiding in quickly and conveniently securing tractor attachments to a PTO spline of a tractor or other machine.

2. Description of the Related Art

Tractor power take off (PTO) attachment sites are well known in the art and are a conventional means to secure tractor implements, such as loaders, cutters, mowers, and the like to a tractor. Conventionally, the attachment involves a PTO spline located on the tractor, and a PTO attachment site on the implement. The engagement of these two locations allows for power to flow to the implement.

One of the problems commonly associated with conventional PTO attachment sites is the difficulty in connecting the implement to the tractor. These connections are difficult to engage and require precise alignment and multiple tries.

Accordingly, although great strides have been made in the area of tractor implement connection systems, many shortcomings remain.

SUMMARY OF THE INVENTIONS

In one aspect, the present inventions may include an attachment device for connecting a power take off (PTO) shaft to a drive shaft of an implement comprising: a connection device body including a cylindrical housing having an annular engagement member at a first end of the cylindrical housing and a splined shaft at a second end of the cylindrical housing, the annular engagement member having a plurality of connection teeth facing away from the cylindrical housing; a second body including a cylindrical body member having an annular plate, the cylindrical body member having a splined bore therethrough and an annular groove disposed around an outer surface of the cylindrical body member, the annular plate including at least one slot; and an annular adapter including at least one projection extending away from a first side of the annular adapter and adapted for slidable engagement with the at least one slot in the annular plate of the second body, the annular adapter further including a plurality of adapter teeth extending away from a second side of the annular adapter and adapted for releasable engagement with the connection teeth on the annular engagement member. Another feature of this aspect of the present inventions may be that the device may further include a cylindrical sleeve disposed around the cylindrical housing of the connection device body, the cylindrical sleeve being moveable between an engaged position and a disengaged position. Another feature of this aspect of the present inventions may be that the device may further include a spring disposed around the cylindrical housing of the connection device body and between the annular engagement member and the cylindrical sleeve. Another feature of this aspect of the present inventions may be that the device may further include a retaining ring adapted for removable engagement with an annular slot around an exterior surface of the cylindrical housing of the connection device body, the cylindrical sleeve been disposed between the retaining ring and the annular engagement member. Another feature of this aspect of the present inventions may be that the device may further include a ball bearing disposed within an aperture disposed in the cylindrical housing of the connection device body, the ball bearing releasably engageable with an outer groove in the cylindrical body member of the second body and an annular groove in an internal bore of the cylindrical sleeve. Another feature of this aspect of the present inventions may be that the device may further include a slot in the annular adapter and a connector disposed through the slot, the connector securing the annular adapter to the annular plate of the second body. Another feature of this aspect of the present inventions may be that the connector may be adapted for movement within the slot in the annular adapter to allow rotational movement of the annular adapter relative to the annular plate of the second body to facilitate alignment and engagement between the adapter teeth on the annular adapter and the connection teeth on the annular engagement member of the connection device body. Another feature of this aspect of the present inventions may be that the device may further include a locking clip disposed between the annular engagement member on the connection device body and the cylindrical sleeve when the cylindrical sleeve is in its engaged position. Another feature of this aspect of the present inventions may be that the cylindrical body member of the second body includes a threaded bore therethrough and adapted for receiving a set screw for engagement with the PTO shaft.

In another aspect, the present inventions may include an attachment device for connecting a power take off (PTO) shaft to a drive shaft of an implement comprising: a connection device body including a cylindrical housing having an annular engagement member at a first end of the cylindrical housing and a splined shaft at a second end of the cylindrical housing, the annular engagement member having a plurality of connection teeth facing away from the cylindrical housing; a second body including a cylindrical body member having an annular plate, the cylindrical body member having a splined bore therethrough and an annular groove disposed around an outer surface of the cylindrical body member, the annular plate including at least one slot; an annular adapter including at least one projection extending away from a first side of the annular adapter and adapted for slidable engagement with the at least one slot in the annular plate of the second body, the annular adapter further including a plurality of adapter teeth extending away from a second side of the annular adapter and adapted for releasable engagement with the connection teeth on the annular engagement member; and a cylindrical sleeve disposed around the cylindrical housing of the connection device body, the cylindrical sleeve being moveable between an engaged position and a disengaged position. Another feature of this aspect of the present inventions may be that the device may further include a spring disposed around the cylindrical housing of the connection device body and between the annular engagement member and the cylindrical sleeve. Another feature of this aspect of the present inventions may be that the device may further include a retaining ring adapted for removable engagement with an annular slot around an exterior surface of the cylindrical housing of the connection device body, the cylindrical sleeve been disposed between the retaining ring and the annular engagement member. Another feature of this aspect of the present inventions may be that the device may further include a ball bearing disposed within an aperture disposed in the cylindrical housing of the connection device body, the ball bearing releasably engageable with an outer groove in the cylindrical body member of the second body and an annular groove in an internal bore of the cylindrical sleeve. Another feature of this aspect of the present inventions may be that the device may further include a slot in the annular adapter and a connector disposed through the slot, the connector securing the annular adapter to the annular plate of the second body. Another feature of this aspect of the present inventions may be that the connector may be adapted for movement within the slot in the annular adapter to allow rotational movement of the annular adapter relative to the annular plate of the second body to facilitate alignment and engagement between the adapter teeth on the annular adapter and the connection teeth on the annular engagement member of the connection device body. Another feature of this aspect of the present inventions may be that the device may further include a locking clip disposed between the annular engagement member on the connection device body and the cylindrical sleeve when the cylindrical sleeve is in its engaged position. Another feature of this aspect of the present inventions may be that the cylindrical body member of the second body includes a threaded bore therethrough and adapted for receiving a set screw for engagement with the PTO shaft.

In yet another aspect, the present inventions may include an attachment device for connecting a power take off (PTO) shaft to a drive shaft of an implement comprising: a connection device body including a cylindrical housing having an annular engagement member at a first end of the cylindrical housing and a splined shaft at a second end of the cylindrical housing, the annular engagement member having a plurality of connection teeth facing away from the cylindrical housing; a second body including a cylindrical body member having an annular plate, the cylindrical body member having a splined bore therethrough and an annular groove disposed around an outer surface of the cylindrical body member, the annular plate including at least one slot; an annular adapter including at least one projection extending away from a first side of the annular adapter and adapted for slidable engagement with the at least one slot in the annular plate of the second body, the annular adapter further including a plurality of adapter teeth extending away from a second side of the annular adapter and adapted for releasable engagement with the connection teeth on the annular engagement member; a cylindrical sleeve disposed around the cylindrical housing of the connection device body, the cylindrical sleeve being moveable between an engaged position and a disengaged position; and a spring disposed around the cylindrical housing of the connection device body and between the annular engagement member and the cylindrical sleeve. Another feature of this aspect of the present inventions may be that the device may further include a retaining ring adapted for removable engagement with an annular slot around an exterior surface of the cylindrical housing of the connection device body, the cylindrical sleeve been disposed between the retaining ring and the annular engagement member. Another feature of this aspect of the present inventions may be that the device may further include a ball bearing disposed within an aperture disposed in the cylindrical housing of the connection device body, the ball bearing releasably engageable with an outer groove in the cylindrical body member of the second body and an annular groove in an internal bore of the cylindrical sleeve. Another feature of this aspect of the present inventions may be that the device may further include a slot in the annular adapter and a connector disposed through the slot, the connector securing the annular adapter to the annular plate of the second body. Another feature of this aspect of the present inventions may be that the connector may be adapted for movement within the slot in the annular adapter to allow rotational movement of the annular adapter relative to the annular plate of the second body to facilitate alignment and engagement between the adapter teeth on the annular adapter and the connection teeth on the annular engagement member of the connection device body. Another feature of this aspect of the present inventions may be that the device may further include a locking clip disposed between the annular engagement member on the connection device body and the cylindrical sleeve when the cylindrical sleeve is in its engaged position.

Other features, aspects and advantages of the present inventions will become apparent from the following discussion and detailed description.

BRIEF DESCRIPTION OF THE DRAWINGS

The novel features believed characteristic of the embodiments of the present inventions are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3 is an exploded view of the attachment device shown in FIG. 2.

FIG. 5 is a side view in partial cross section of a connection device body, which is the third main component of the attachment device shown in FIGS. 1-3.

FIG. 5A is a front plan view of the connection device body shown in FIG. 5.

FIG. 5B is a rear plan view of the connection device body shown in FIG. 5.

FIG. 5C is cross-sectional view taken along line 5C-5C in FIG. 5.

FIG. 5D is a partial cutaway side view of a portion of the connection device body shown in FIG. 5.

Figure 1:
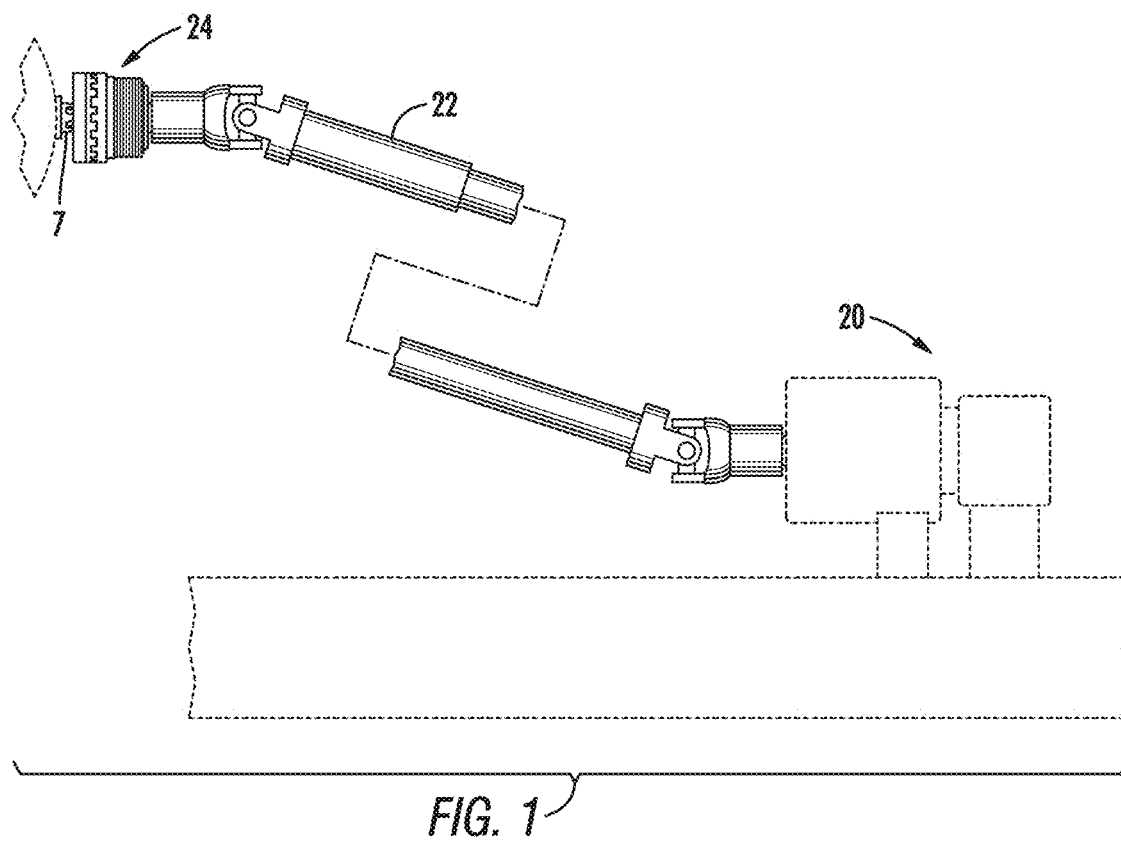
FIG. 1 is a side view illustrating the drive shaft of a farm implement connected via an attachment device of the present inventions to a tractor PTO spline.

While the systems and methods of use of the present inventions are susceptible to various modifications and alternative forms, specific embodiments thereof have been shown by way of example in the drawings and are herein described in detail. It should be understood, however, that the description herein of the specific embodiments is not intended to limit the inventions to the particular embodiments disclosed, but on the contrary, the inventions cover all modifications, equivalents, and alternatives falling within the spirit and scope of the present inventions as defined by the appended claims.

DETAILED DESCRIPTION OF THE INVENTION

Illustrative embodiments of the systems and methods of use of the present inventions are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The systems and methods of use in accordance with the present inventions overcomes one or more of the above-discussed problems commonly associated with conventional tractor implement attachment systems. Specifically, the present inventions provide attachment devices to quickly and effectively mount a tractor implement through a PTO connection site. These and other unique features of the systems and methods of use are discussed below and illustrated in the accompanying drawings.

The systems and methods of use will be understood, both as to their structure and operation, from the accompanying drawings, taken in conjunction with the accompanying description. Several embodiments of the systems and methods are presented herein. It should be understood that various components, parts, and features of the different embodiments may be combined together and/or interchanged with one another, all of which are within the scope of the present inventions, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The specific embodiments herein described are not intended to be exhaustive or to limit the inventions to the precise form disclosed. They are chosen and described to explain certain principles of the inventions and their application and practical use to enable others skilled in the art to follow their teachings.

Figure 2:
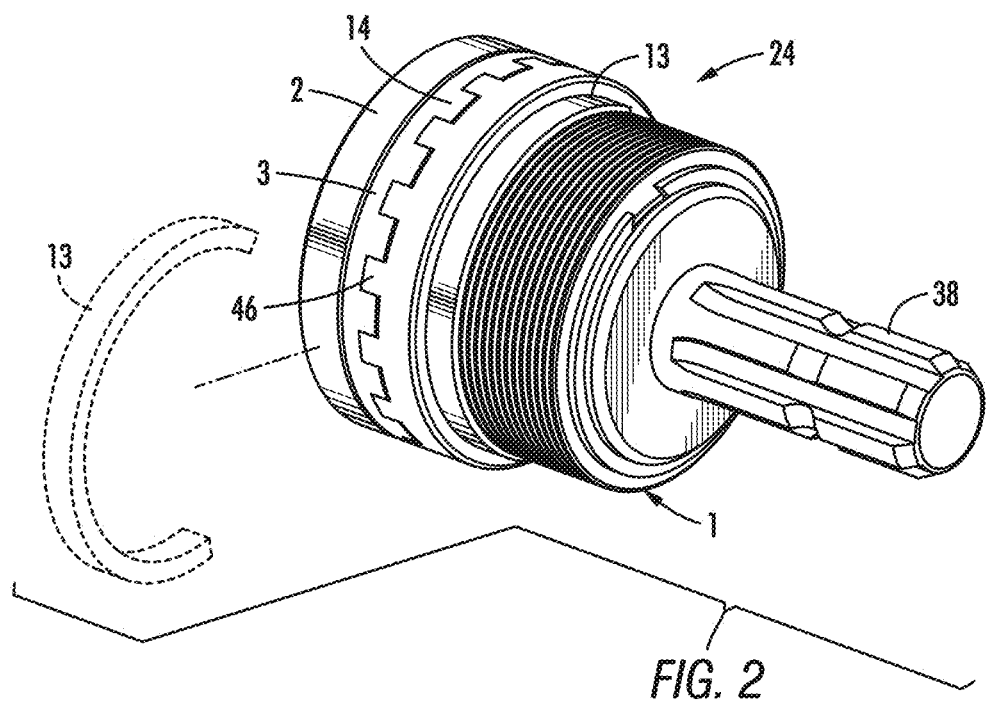
FIG. 2 is a perspective view of a specific embodiment of an assembled attachment device constructed in accordance with the present inventions.

Referring now to the drawings wherein like reference characters identify corresponding or similar elements throughout the several views, FIG. 1 depicts a farm implement 20 having a drive shaft 22 engaged with an attachment device 24 constructed in accordance with the present inventions, which in turn is engaged with a tractor PTO spline 7. Referring now to FIG. 2, a perspective view of the attachment device 24 is shown by itself, disconnected from the implement 20 and tractor PTO spline 7.

FIG. 3 depicts an exploded view of an attachment device in accordance with a specific embodiment of the present inventions. It will be appreciated that the attachment devices disclosed herein overcome one or more of the above-listed problems commonly associated with PTO attachment systems.

As shown in FIG. 3, in the specific embodiment shown therein, the attachment device 24 may include a connection device body 1 configured to engage with a second body 2 via an adapter 3. As shown, the adapter 3 may include a plurality of teeth 14 that engage with corresponding teeth 46 on the connection device body 1, as shown for example in FIG. 2. The second body 2 may be configured to engage with the tractor PTO spline 7. The attachment device 24 may further include ball bearings 4, a sleeve 5, one or more alignment pins 6, one of more set screws 8, one or more internal retaining rings 9, one or more external retaining rings 10 and 11, a spring 12, and a locking clip 13.

An assembled view of an attachment device 24 is shown in FIG. 2, wherein the connection device body 1 engages with the second body 2, this assembly then further engaging with the tractor PTO spline 7, as shown in FIGS. 1 and 3. It should be appreciated that the second body 2 can be engaged with the PTO spline 7, which is then ready to receive the connection device body 1, via the adapter 3. This allows for easy and fast connection.

With reference to FIGS. 2 and 3, it can be seen that the attachment device 24 may include three basic components: the connection device body 1; the second body 2; and the adapter 3. As shown for example in FIG. 4, the second body 2 includes a splined bore 26 adapted for engagement with the PTO tractor spline 7, which is secured by at least one set screw 8 engaged with an annular groove in the PTO tractor spline 7. The set screws 8 may be secured with retaining rings 9.

Figures 4, 4A, 4B, 4C, 4D:
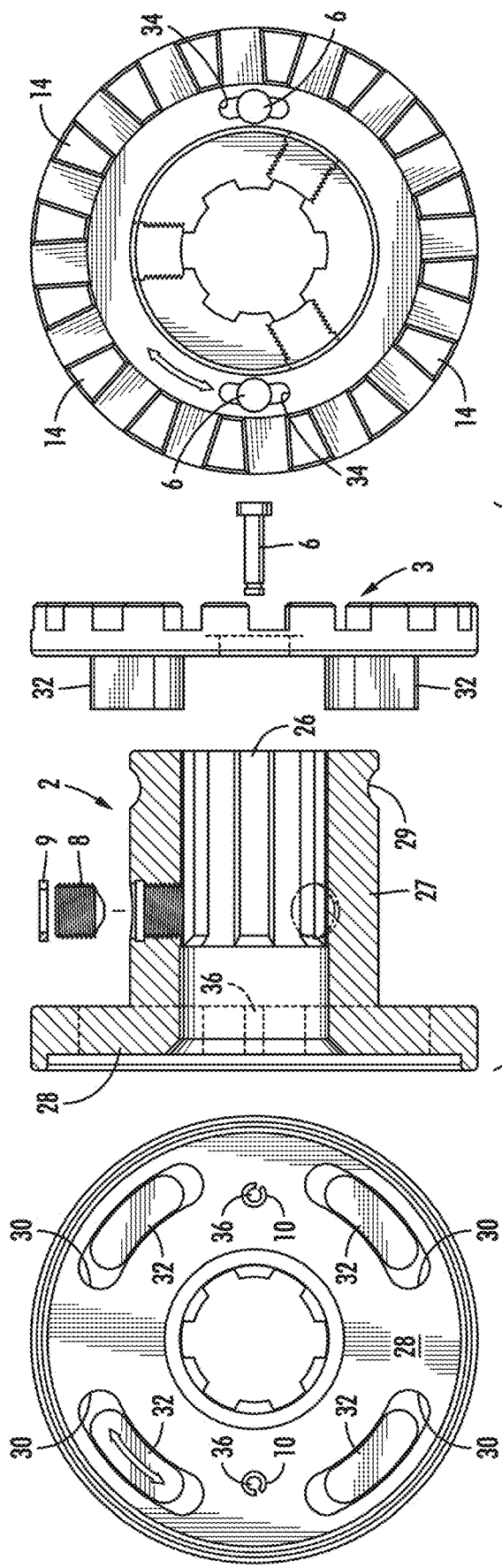
FIG. 4 is a side view of a second body shown in cross section and disposed adjacent an adapter, the second body and adapter being two of the three main components of the attachment device shown in FIGS. 1-3.
FIG. 4A is a front plan view of the second body shown in FIG. 4 with projections from the adapter disposed within slots in the second body.
FIG. 4B is a rear plan view of the adapter shown attached with screws to an annular plate of the second body, and illustrating that the screws are disposed through alignment slots in the adapter.
FIG. 4C is another front plan view of the second body like FIG. 4A, but with the adapter rotated so that the adapter projections are resting against ends of the slots in the second body.
FIG. 4D is another rear plan view of the adapter like FIG. 4B, but with the adapter rotated so that the screws are resting against ends of the alignment slots in the adapter.

As shown in FIGS. 4, 4A and 4C, the second body 2 may include a cylindrical body member 27, and an annular flange or plate 28 having a plurality of slots 30. In a specific embodiment, the slots 30 may be arcuate slots. The cylindrical body member 27 includes an outer groove 29 around an exterior surface of the cylindrical body member 27. The adapter 3 may include a plurality of projections 32 adapted to be received within the slots 30 on the second body 2. In a specific embodiment, the projections 32 may be arcuate projections. The width of the projections 32 is less than the width of the slots 30 so as to allow for lateral movement of the projections 32 within the slots 30 when the adapter 3 is rotated relative to the second body 2, as shown for example in FIG. 4A. The projections 30 are shown approximately centered within the slots 30 in FIG. 4A, whereas in FIG. 4C, the plate 28 has been rotated as far as it will go in one direction such that the projections 32 are resting against ends of the slots 30.

As shown in FIGS. 4B and 4D, the adapter 3 may include one or more alignment slots 34 adapted for receiving the alignment pins 6. The alignment pins 6 pass through the alignment slots 34 in the adapter 3 and through corresponding bore holes 36 in the annular plate 28 of the second body 2 to secure the adapter 3 to the second body 2. The alignment pins 6 have a head that rests against and does not pass through the alignment slots 34. The distal ends of the alignment pins 6 may include an annular slot for receiving internal retaining rings 10, which when installed hold the alignment pins 6 in place against a forward or front surface of the annular plate 28 of the second body 2. In this manner, the alignment pins 6 secure the adapter 3 to the second body 2, but do so in a way that the adapter 3 can be rotated a short distance in two directions relative to the second body 2 corresponding to the range of motion of the alignment pins 6 within the alignment slots 34. This allows rotational movement of the adapter teeth 14 to facilitate proper alignment and engagement of the adapter teeth 14 on the adapter 3 with the connection teeth 46 on the connection device body 1, as further described and explained below.

As shown for example in FIGS. 2 and 3, the connection device body 1 includes a splined shaft 38 adapted for connection to the drive shaft 22 on the implement 20 to be powered by the tractor PTO. In a specific embodiment, the connection device body 1 may include an annular or cylindrical housing 40 with an annular slot 42 around an exterior surface of the housing 40 that is adapted for receiving the external retaining ring 11. As explained in more detail below, the purpose of the retaining ring 11 is to retain the sleeve 5 in place around the housing 40. The housing 40 includes an internal bore hole 41 that is coaxial with the splined shaft 38. The connection device body 1 may also include an annular engagement member 44 at a forward end of the housing 40. The annular engagement member 44 is coaxial with the housing 40 and the shaft 38. The annular engagement member 44 includes a plurality of teeth 46 adapted for releasable mating engagement with a plurality of teeth 14 on the adapter 3. The annular housing 40 may be disposed between the annular engagement member 44 and the splined shaft 38. In a specific embodiment, the shaft 38, the housing 40, and the annular engagement member 44 may be formed as a single unit.

In a specific embodiment, the spring 12 is disposed around the annular housing 40, as is the moveable sleeve 5. The sleeve 5 is in the shape of a cylinder, and includes an internal bore 48. The internal bore 48 is sized for slidable movement around the exterior surface of the housing 40. The internal bore 48 may include an annular groove 50, the purpose of which will be explained below. The spring 12 is disposed between the annular engagement member 44 and the sleeve 5. The sleeve 5 and spring 12 are held in place around the annular housing 40 by placing the external retaining ring 11 in the annular groove 50. The sleeve 5 is moveable between an engaged position (as shown in FIGS. 5 and 5C) and a disengaged position (as shown in FIG. 5D). The sleeve 5 is normally held in its engaged position under force of the spring 12. To move the sleeve 5 to its disengaged position, it is pushed forward toward the front wall of the connection device body 1 that is defined by the annular engagement member 44, which compresses the spring 12.

The attachment device 24 may also include a locking clip 13, which may be C-shaped, and may be positioned around the spring 12 to occupy the space between the annular engagement member 44 and the forward end of the sleeve 5. In this manner, the locking clip 13 functions to prevent the sleeve 5 from sliding forward when the attachment device 24 is in use. In other words, the locking clip 13 prevents the connection device body 1 (and the drive shaft 22 of the farm implement 20) from being disengaged from the second body 2 (and the tractor PTO spline 7).

With reference to FIG. 2, the annular housing 40 may also include at least one aperture 52 adapted for holding a ball bearing 4. In a specific embodiment, the housing 40 may include three apertures 52 for holding three ball bearings 4. When the sleeve 5 is in its engaged position (as shown in FIGS. 5 and 5C), the ball bearings 4 are held down for engagement with the outer groove 29 of the second body 2, as further discussed below. When the sleeve 5 is moved forward into its disengaged position as shown in FIG. 5D, the interior annular groove 50 in the bore 48 of the sleeve 5 is moved into alignment with the ball bearings 4, which then retract into the interior annular groove 50 in the sleeve 5.

In operation, the splined bore 26 of the second body 2 (with attached adapter 3) is engaged with the tractor PTO spline shaft 7, and secured thereto with the set screw 8. The splined shaft 38 of the connection device body 1 is secured to the drive shaft 22 of the farm implement 20 in a known manner. Once those two connections are established, the sleeve 5 is pushed forward into its disengaged position (see FIG. 5D) and the annular housing 40 of the connection device body 1 is pushed and placed over the cylindrical body member 27 of the second body 2. Keeping the sleeve 5 in its disengaged position, the adapter 3 is rotated until the adapter teeth 14 on the adapter 3 are aligned with the connection teeth 46 on the connection device body 1. The sleeve 5 can then be released and the spring 12 will push the sleeve 5 back into its engaged position, at which point the ball bearings 4 will be engaged in the annular groove 29 around the cylindrical body member 27 of the second body 2, the adapter teeth 14 will be engaged with the connection teeth 46, and the connection device body 1 and the second body 2 will be connected as a singular unit. The locking clip 13 may then be placed into position around the spring 12 to prevent longitudinal movement of the sleeve 5, thereby preventing disengagement of the connection device body 1 and the second body 2 (i.e., preventing disengagement of the PTO shaft 7 and the implement drive shaft 22).

It should be appreciated that the connection devices of the present inventions may provide for an attachment to easily connect various pieces of equipment to PTO connection sites, thereby providing a benefit over the prior art.

The particular embodiments disclosed above are illustrative only, as the embodiments may be modified and practiced in different but equivalent manners apparent to those skilled in the art by having the benefit of the teachings herein. It is therefore evident that the particular embodiments disclosed above may be altered or modified, and all such variations are considered within the scope and spirit of the present inventions. Although the present inventions are shown above, they are not limited to just those embodiments, but are amenable to various changes and modifications without departing from the spirit thereof.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. An attachment device for connecting a power take off (PTO) shaft to a drive shaft of an implement comprising:
   a connection device body including a cylindrical housing having an annular engagement member at a first end of the cylindrical housing and a splined shaft at a second end of the cylindrical housing, the annular engagement member having a plurality of connection teeth facing away from the cylindrical housing;
   a second body including a cylindrical body member having an annular plate, the cylindrical body member having a splined bore therethrough and an annular groove disposed around an outer surface of the cylindrical body member, the annular plate including at least one slot; and
   an annular adapter including at least one projection extending away from a first side of the annular adapter and adapted for slidable engagement with the at least one slot in the annular plate of the second body,
   the annular adapter further including a plurality of adapter teeth extending away from a second side of the annular adapter and adapted for releasable engagement with the connection teeth on the annular engagement member.

2. The attachment device of claim 1, further including a cylindrical sleeve disposed around the cylindrical housing of the connection device body, the cylindrical sleeve being moveable between an engaged position and a disengaged position.

3. The attachment device of claim 2, further including a spring disposed around the cylindrical housing of the connection device body and between the annular engagement member and the cylindrical sleeve.

4. The attachment device of claim 2, further including a retaining ring adapted for removable engagement with an annular slot around an exterior surface of the cylindrical housing of the connection device body, the cylindrical sleeve been disposed between the retaining ring and the annular engagement member.

5. The attachment device of claim 2, further including a locking clip disposed between the annular engagement member on the connection device body and the cylindrical sleeve when the cylindrical sleeve is in its engaged position.

6. The attachment device of claim 1, further including a ball bearing disposed within an aperture disposed in the cylindrical housing of the connection device body, the ball bearing releasably engageable with an outer groove in the cylindrical body member of the second body and an annular groove in an internal bore of the cylindrical sleeve.

7. The attachment device of claim 1, further including a slot in the annular adapter and a connector disposed through the slot, the connector securing the annular adapter to the annular plate of the second body.

8. The attachment device of claim 7, wherein the connector is adapted for movement within the slot in the annular adapter to allow rotational movement of the annular adapter relative to the annular plate of the second body to facilitate alignment and engagement between the adapter teeth on the annular adapter and the connection teeth on the annular engagement member of the connection device body.

9. The attachment device of claim 1, wherein the cylindrical body member of the second body includes a threaded bore therethrough and adapted for receiving a set screw for engagement with the PTO shaft.

* * * * *

UNITED STATES PATENT AND TRADEMARK OFFICE
CERTIFICATE OF CORRECTION

Page 1 of 1

PATENT NO. : 11,746,831 B1
APPLICATION NO. : 17/215771
DATED : September 5, 2023
INVENTOR(S) : Cedric Williams et al.

It is certified that error appears in the above-identified patent and that said Letters Patent is hereby corrected as shown below:

On the Title Page

Item (12) delete "Williams" and insert -- Williams et al. --.

Item (72) "Inventor" should be changed to "Inventors" and should include the following additional inventor: "Kenneth Spector, Katy, TX (US)".

Signed and Sealed this
Fifth Day of August, 2025

Coke Morgan Stewart
*Acting Director of the United States Patent and Trademark Office*